Patented Oct. 28, 1952

2,615,871

UNITED STATES PATENT OFFICE 2,615,871

COPOLYMERS OF VINYLIDENE CYANIDE WITH ALKYL METHACRYLATES

Vernon L. Folt, Akron, Ohio, assignor to The B. F. Goodrich Company, New York, N. Y., a corporation of New York No Drawing. Application February 14, 1950, Serial No. 144,198

11 Claims. (Cl. 260—78.5)

This invention relates to the preparation of novel copolymers of vinylidene cyanide with alkyl methacrylates, which copolymers are extremely useful synthetic resins being especially useful in the preparation of filaments, films and molded articles.

In U. S. Patent 2,476,270, to Alan E. Ardis, and in copending applications, Serial No. 63,434, filed December 3, 1948, now U. S. Patent 2,502,412, and Serial No. 79,712, filed March 4, 1949, now U. S. Patent 2,514,387, novel methods for the preparation of monomeric vinylidene cyanide are disclosed. These methods involve, respectively, the pyrolysis at 400° C. to 750° C. of 1-acetoxy-1,1-dicyano ethane, the pyrolysis of 1,1,3,3-tetracyano propane and the pyrolysis at 400° C. to 800° C. of 4,4-dicyanocyclohexene, 4,4-dicarbamyl cyclohexene or 4-cyano-4-carbamyl cyclohexene. In another copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3 it reacts therewith to give solid 4,4-dicyanocyclohexene.

It has now been discovered that when monomeric vinylidene cyanide of the above physical and chemical characteristics is copolymerized with alkyl methacrylates, in the presence of a free radical polymerization catalyst and in a manner such that the polymerization charge contains from 20 to 90 mole per cent of monomeric vinylidene cyanide, new and highly useful copolymers are obtained. These copolymers are essentially 1:1 alternating copolymers, that is, copolymers possessing the structure:

$$-M_1-M_2(M_1-M_2)_xM_1-M_2-$$

wherein each $M_1$ is a vinylidene cyanide unit

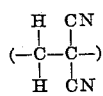

and each $M_2$ is a unit of an alkyl methacrylate

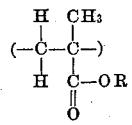

and $x$ is a polydigit number, preferably in the range of 100 to 15,000.

The copolymers obtained when 20 to 90 mole percent vinylidene cyanide is present in the charge have been found by analysis for nitrogen to contain approximately 50 mole percent vinylidene cyanide regardless of the degree of monomer to polymer conversion. This is strong evidence for an alternating structure. Further supporting evidence is found in the copolymerization equation of F. N. Lewis, C. Walling, et al., Journal of the American Chemical Society, 70, 1519 (1948):

$$\frac{d[M_1]}{d[M_2]}=\frac{[M_1]}{[M_2]}\frac{r_1[M_1]+[M_2]}{r_2[M_2]+[M_1]}$$

wherein $M_1$=Concentration of unreacted monomer $M_1$
$M_2$=Concentration of unreacted monomer $M_2$
$r_1$=ratio of the rate constants for the reaction of an $M_1$ type radical with $M_1$ and $M_2$ respectively
$r_2$=ratio of the rate constants for the reaction of an $M_2$ type radical with $M_2$ and $M_1$ respectively When the product of $r_1$ and $r_2$ (the values of $r_1$ and $r_2$ being determined by solving the equation for $r_1$ and $r_2$) is equivalent to zero, a 1:1 alternating copolymer is formed, that is, a copolymer having the

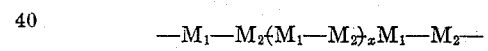

structure shown hereinabove. When $M_1$ is vinylidene cyanide and $M_2$ is methyl methacrylate, it has been found that $r_1=0.0307$ and $r_2=0.0455$; therefore, the product of $r_1$ and $r_2$ is 0.00139 or nearly zero thus indicating the 1:1 alternation of the vinylidene cyanide and the alkyl methacrylate units.

The alternating copolymers are insoluble in such organic solvents as benzene and acetic acid but are soluble in other solvents such as dimethyl formamide to give solutions useful for spinning into excellent strong, highly resistant fibers and for casting into films. Copolymers produced from monomer charges containing less than 20% vinylidene cyanide are not alternating; rather they contain generally from about 10 to 45% copolymerized vinylidene cyanide. Their solubility in solvents varies with vinylidene cyanide content, those of lowest vinylidene cyanide content (produced from monomer mixtures containing 1 to 5 weight percent of vinylidene cyanide) being soluble even in benzene. Such copolymers are also useful as fibers and filaments and in addition are quite useful as molding and casting resins, having much higher strength and greater toughness than straight homopolymers of the alkyl methacrylates. The copolymers produced from monomer mixtures containing more than 90 mole percent vinylidene cyanide in the charge possess more than 50 mole percent of copolymerized vinylidene cyanide and are highly insoluble except in a few solvents including dimethyl formamide. They possess excellent strength and give very strong fibers but unlike the alternating copolymers (which are alkali resistant) suffer from the disadvantage of alkali sensitivity. All the copolymers soften when heated, softening points varying with vinylidene cyanide content, the alternating copolymers having softening points of the order of 150 to 180° C., while the copolymers of higher vinylidene cyanide content soften at higher temperatures.

The methacrylic acid esters which are polymerized with vinylidene cyanide in accordance with this invention possess the structure

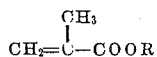

wherein R is an alkyl radical. The preferred alkyl methacrylates are those in which R contains from 1 to 8 carbon atoms, for example, methyl methacrylate, ethyl methacrylate, propyl methacrylate, butyl methacrylate, amyl methacrylate, hexyl methacrylate, heptyl methacrylate and octyl methacrylate. However, it is to be understood that those alkyl methacrylates in which R contains more than 8 carbon atoms, for example, decyl methacrylate and the like, also form useful copolymers with vinylidene cyanide and are included within the scope of the invention.

The polymerization may be carried out in a number of different ways. For example, one preferred method consists in first dissolving the vinylidene cyanide and the alkyl methacrylate in benzene or other aromatic solvent such as toluene, methyl toluene, trichloro benzene, or the like, free from impurities which initiate the ionic polymerization of the monomer, and preferably in an amount such that the solvent comprises approximately 30 to 80% by weight of the total solution. A polymerization catalyst is included in this solution and the resulting mixture is maintained at a temperature of about 20° C. to 80° C. whereupon polymerization occurs to form the desired copolymer. In instances where the charging ratio contains more than about 5 weight percent of vinylidene cyanide the copolymer precipitates as a white resinous powder of small particle size; if less than this amount of vinylidene cyanide monomer is present in the charge the copolymer is obtained as a solution in the aromatic solvent.

Alternatively, the polymerization may be carried out without the use of a solvent or other liquid medium for the monomers, that is, simply by heating and agitating a mixture of the monomers and polymerization catalyst to effect the polymerization. The copolymers formed are sometimes at least partially soluble in the monomer mixtures, but upon the addition of a non-solvent (aromatic compounds such as those mentioned in the foregoing paragraph are non-solvents for copolymers produced using most charging ratios) the copolymer precipitates from the polymerization mixture and is recovered by filtering or other means.

The temperature at which the polymerization is conducted is preferably in the range of 20 to 80° C., but temperatures as low as 0° C. and as high are 100° C. are operative.

It is to be understood, of course, that regardless of the polymerization method utilized, the polymerization should be stopped before either of the monomers is entirely consumed, in order that pure copolymer will be obtained. Otherwise, when either of the monomers is completely used up, the product will contain straight polymer obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

The catalyst which is used in the polymerization process is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, pelargonyl peroxide, tertiary butyl hydroperoxide, tetralin peroxide, and the like. In general, from 0.01 to 2.0% by weight (based on the total weight of the monomers charged) of the catalyst is utilized, although smaller or larger amounts may be utilized if desired. By regulating the amount of the catalyst it is possible to control very readily and accurately the molecular weight of the copolymer. For example, to obtain a high molecular weight copolymer, a small quantity of catalyst is used, while lower molecular copolymers are obtained by the use of larger amounts of catalyst.

The following examples illustrate the preparation of copolymers of vinylidene cyanide with alkyl methacrylates in accordance with this invention, but are not to be construed as a limitation upon the scope thereof, for there are, of course, numerous possible variations and modifications. In the examples, all parts are by weight.

*Examples I to VII*

A series of vinylidene cyanide:methyl methacrylate copolymers is prepared by dissolving varying amounts of the two monomers in benzene, adding 0.15% by weight (based on the total weight of the monomers charged) of o,o'-dichlorobenzoyl peroxide, and heating the resulting mixture to a temperature of about 50° C. for 2 to 4 hours whereupon polymerization occurs to the extent of about 8 to 20% of the total monomer present to form the resinous copolymer which precipitates from the benzene solution and is recovered by filtering. The monomer charging rates, parts benzene, and mole percent vinylidene cyanide in the copolymer (based on nitrogen analysis) are recorded in the table below:

| Example | Parts Vinylidene Cyanide | Parts Methyl Methacrylate | Mole Percent Vinylidene Cyanide in Charge | Parts Benzene | Mole Percent Vinylidene Cyanide in Copolymer |
|---|---|---|---|---|---|
| I | 9.0 | 1.0 | 92.09 | 15.8 | 57.81 |
| II | 7.5 | 2.5 | 79.42 | 15.8 | 52.27 |
| III | 5.0 | 5.0 | 56.22 | 15.8 | 50.18 |
| IV | 5.0 | 15.0 | 29.95 | 15.8 | 45.67 |
| V | 3.0 | 17.0 | 18.44 | 15.8 | 43.29 |
| VI | 2.0 | 18.0 | 12.46 | 15.8 | 42.41 |
| VII | 1.0 | 19.0 | 6.31 | 11.9 | 38.13 |

*Examples VIII to XV*

Examples I to VII are repeated except that no solvent is utilized, the monomers being mixed together with the catalyst and the resulting mixture then heated. The polymerization is stopped by cooling the polymerization mixture to about −20° C. Benzene is then added, whereupon the copolymer precipitates and is recovered by filtering. Analysis of each of the copolymers thus obtained gives results which correspond almost exactly with those obtained in Examples I to VII.

It will be noted from the above examples that when the polymerization charge contains from about 20 to 90 mole percent of vinylidene cyanide the resulting copolymer contains approximately 50 mole percent vinylidene cyanide, thus substantiating the fact that these are 1:1 alternating copolymers.

*Example XVI*

0.5 part vinylidene cyanide and 24.5 parts of methyl methacrylate are mixed together in the presence of 0.15% by weight of o,o′-dichlorobenzoyl peroxide. The mixture is then heated to a temperature of about 50° C., whereupon the copolymer forms as a hard, clear gel. It is determined by analysis that the copolymer contains 27.59% of polymerized vinylidene cyanide.

When the above examples are repeated utilizing other of the alkyl methacrylates disclosed hereinabove, for example, butyl or octyl methacrylate, useful copolymers are again obtained which are essentially 1:1 alternating copolymers when the charge contains from 20 to 90 mole percent of vinylidene cyanide. Moreover, when the above examples are repeated utilizing other of the methods of polymerization or other of the peroxygen catalysts disclosed hereinabove, excellent results are obtained.

As disclosed hereinabove, the copolymers of vinylidene cyanide with alkyl methacrylates are very valuable in the preparation of solutions from which can be spun filaments of any desired size having many advantageous properties including very high strength. The copolymers obtained in Examples I to VI above remain substantially unaffected even after being subjected to the action of an aqueous alkali solution for periods ranging from 144 to 700 hours. Accordingly, such copolymers are very useful in applications where alkaline insensitivity is important. In addition to being useful in the preparation of filaments, solutions of the copolymers in dimethyl formamide or other suitable solvent are also useful in the casting of excellent films. The physical properties of such filaments and films can be improved by "hot-stretching," a method whereby the article is stretched in a hot zone in a series of steps, a process disclosed in a copending application, Serial No. 113,018, filed August 29, 1949. Also, the copolymers of this invention may be molded to form hard clear solid objects, and since these copolymers are characterized by having a definite softening point, they may be melt spun.

Although specific examples of the invention have been herein described, it is not intended to limit the invention solely thereto, but to include all of the variations and modifications falling within the spirit and scope of the appended claims.

I claim:

1. A copolymer of vinylidene cyanide and an alkyl methacrylate, said copolymer possessing essentially the structure

wherein each $M_1$ represents the vinylidene cyanide unit of the structure

each $M_2$ represents a unit of said alkyl methacrylate and $x$ is a polydigit number, the monomeric vinylidene cyanide entering into said copolymer being a liquid at room temperature and a crystalline solid at 0° C., having a melting point, when in purest form, of substantially 9.0° C. to 9.7° C., and being characterizable chemically by the ability to undergo on contact with water at room temperature an instantaneous homopolymerization reaction to give a solid, water-insoluble resin.

2. The copolymer of claim 1 wherein the alkyl radical of the alkyl methacrylate contains from 1 to 8 carbon atoms.

3. The copolymer of claim 2 wherein the alkyl methacrylate is methyl methacrylate.

4. The method which comprises preparing a mixture containing monomeric vinylidene cyanide, a monomeric alkyl methacrylate and a peroxygen polymerization catalyst, the monomeric vinylidene cyanide being present in said mixture in an amount from 20 to 90 mole per cent based on the total monomer weight and being a liquid at room temperature and a crystalline solid at 0° C. having a melting point, when in purest form, of substantially 9.0° C. to 9.7° C. and being characterizable chemically by the ability to undergo on contact with water at room temperature an instantaneous homopolymerization reaction to give a solid, water-insoluble resin, and maintaining the said mixture at a temperature of from 20° C. to 80° C. for a time sufficient to effect copolymerization of the said vinylidene cyanide and alkyl methacrylate and formation of a solid, resinous copolymer possessing essentially the structure

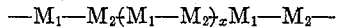

wherein each $M_1$ is a vinylidene cyanide unit, each $M_2$ is a unit of said alkyl methacrylate and $x$ is a polydigit number.

5. The method of claim 4 wherein the alkyl radical of the alkyl methacrylate contains from 1 to 8 carbon atoms.

6. The method of claim 4 wherein the alkyl methacrylate is methyl methacrylate.

7. The method of claim 4 in which the peroxygen catalyst is present in an amount from 0.01 to 2.0% by weight based on the total amount of monomeric vinylidene cyanide and alkyl methacrylate.

8. The method of claim 7 further characterized in that the peroxygen catalyst is o,o'-dichlorobenzoyl peroxide.

9. The method which comprises preparing a solution containing monomeric vinylidene cyanide, a monomeric alkyl methacrylate, a peroxygen polymerization catalyst and a solvent selected from the class consisting of aromatic hydrocarbons and chlorinated aromatic hydrocarbons, the monomeric vinylidene cyanide being present in said solution in an amount from 20 to 90 mole per cent based on the total monomer weight and being a liquid at room temperature and a crystalline solid at 0° C., having a melting point, when in purest form, of substantially 9.0° C. to 9.7° C. and being characterizable chemically by the ability to undergo on contact with water at room temperature an instantaneous homopolymerization reaction to give a solid, water-insoluble resin and maintaining the said solution at a temperature of from 20° C. to 80° C. for a time sufficient to effect copolymerization of the said vinylidene cyanide and alkyl methacrylate and precipitation of a solid, resinous copolymer from the solution, said copolymer possessing essentially the structure $$-M_1-M_2(M_1-M_2)_x M_1-M_2-$$

wherein each $M_1$ is a vinylidene cyanide unit, each $M_2$ is a unit of said alkyl methacrylate and $x$ is a polydigit number.

10. The method of claim 9 in which the solvent comprises 30% to 80% by weight of the solution and the peroxygen catalyst is present in an amount from 0.01% to 2.0% by weight based on the total amount of monomeric vinylidene cyanide and alkyl methacrylate.

11. The method of claim 10 further characterized in that the solvent is benzene and the peroxygen catalyst is o,o'-dichlorobenzoyl peroxide.

VERNON L. FOLT.

REFERENCES CITED

The following references are of record in the file of this patent:

UNITED STATES PATENTS

| Number | Name | Date |
|---|---|---|
| 2,455,653 | Bralley et al. | Dec. 7, 1948 |
| 2,466,395 | Dickey | Apr. 5, 1949 |